United States Patent Office 3,105,754
Patented Oct. 1, 1963

3,105,754
RETARDING THE SOLUBILITY OF NITROGEN-CONTAINING FERTILIZERS
John W. Marx, Bartlesville, Okla., assignor to Phillips Petroleum Company, a corporation of Delaware
No Drawing. Filed June 3, 1960, Ser. No. 33,639
11 Claims. (Cl. 71—30)

This invention relates to novel compositions of matter comprising water-soluble nitrogen-containing fertilizers having retarded rates of solubility in water, and to a method of preparing and utilizing such compositions.

Many solid water-soluble nitrogen-containing compounds, such as urea and ammonium sulfate, are enjoying widespread application as fertilizers because of their abilities to supplement the plant nutrient value of the soil. Such fertilizers are distributed in the field in granular form, an attempt being made to obtain uniform distribution in the soil to prevent the formation of locally concentrated solutions. The distributed fertilizer can not be assimilated in its solid form, but is dependent upon its solution on contact with water, either that supplied by rain or that supplied by man-made means such as irrigation and the like. The rate of solution or leaching of these fertilizers in water is at best unregulated and left to the vagaries of nature. As such, much of the distributed fertilizer will remain in solid form during a dry spell and then when it rains or in damp weather a good deal of it may be dissolved and washed away by run-off water. Or, on being contacted with light rains or normal surface moisture, the solid fertilizer will dissolve and form locally concentrated solutions. Thus, because of the applied fertilizers unregulated rate of solubility in water, it will not be assimilable over a long period of time and the full benefit of its application will not be realized.

Accordingly, an object of this invention is to provide an improved composition of matter comprising water-soluble nitrogen-containing fertilizers having retarded rates of solubility in water. Another object is to provide a novel method of preparing and utilizing such compositions. Another object is to provide an improved solid nitrogen-containing fertilizer having a low rate of solubility in the field such that it is assimilable over a long period of time. Further objects and advantages of this invention will become apparent to those skilled in the art from the following discussion and appended claims.

The above objects are achieved according to this invention by admixing a melt of a solid water-soluble nitrogen-containing fertilizer with a solid water-soluble lyophilic colloid or gelation agent, and solidifying the resulting mixture. Gelation agents especially useful for this purpose representatively include such high molecular weight materials as guar flour, gelatin, and polymerized ethylene oxide. The amount of gelation agent incorporated into the fertilizer melt, stated functionally, is a small amount which is sufficient to retard or regulate the rate of solubility of the fertilizer when the same is distributed in the field and on its contact with water, such that the nutrient fertilizer values are assimilated over a long period of time, e.g. days or months. Generally, for most purposes the amount of gelation agent employed will be in the range of from 0.5 to 20 weight percent, preferably about 2 to 10 weight percent, based on the final product.

After incorporating the gelation agent into the melted nitrogen-containing fertilizer, the mixture is then cooled to solidify the same into a solid mass which can be easily broken up or comminuted for use. Incorporation of the gelation agent into the melted fertilizer can be achieved by any suitable means, such as drums, kettles, and the like, with agitators to provide an intimate mixture. Solidification can be effected by allowing the mixture to cool to ambient temperatures, after which the solidified mass can be crushed or otherwise ground to desired specifications. The nature of the melt after incorporation of the gelation agent will vary and depend upon the particular solid fertilizer used, the degree of solubility retardation desired, and the amount of gelation agent incorporated therein; for example where smaller amounts of gelation agent are used the resulting melt mixture will have the nature of a thick, low viscosity liquid, and where relatively larger amounts of gelation agents are used the resulting melt mixture will be in the form of a gummy mass. After granulating the final product and classifying the same, specification size material can be bagged, stored and shipped to the ultimate consumer for distribution in the field according to well known drillability techniques.

After distribution in the field, the improved composition of matter of this invention will slowly dissolve on contact with the water in the field at a rate which is materially slower than that of untreated fertilizer. Thus, the plant nutrient values of this novel composition will be assimilated over a longer period of time, and the full benefit of its application realized.

Guar flour, which is useful as a gelation agent according to this invention, is sometimes referred to as guar gum and it is obtained from the guar plant, the latter being a legume known botanically as *Cyanopsis tetragonoloba*. It is a vegetable colloid and complex carbohydrate polymer with an average molecular weight of 220,000. Seeds of the guar plant have exceedingly hard and tough characteristics when dry, probably because of the presence of significant amounts of the polysaccharide, galactomannan. The seed coats of the seeds are generally removed by passing the seeds rapidly through a flame which very slightly scorches or sears the seed coat and permits it to be easily removed by a scouring or pearling operation. After removal of the germ by mechanical operation, the endosperm is ground to a fine, light, gray flour. Various commercially available guar flours are available, such as Galatasol and Jaguar. Guar flour can be effectively dispersed in either cold or hot water. High viscosity colloidal dispersions can be obtained at very low guar concentrations and it has from five to eight times the thickening power of starch. As such, guar flour can be very conveniently and readily prepared.

Gelatin, which is also useful as a gelation agent in this invention, is that material obtained by the well-known selective hydrolysis of collagen, the major intercellular protein constituent of the white connective tissue of animal skins and bones. Various grades of this material are commercially available, with molecular weights from about 10,300 to 100,000.

Another useful gelation agent which can be employed in this invention are high molecular weight polymerized ethylene oxide resins. These materials are thermoplastic and are miscible at room temperature with water in all proportions and they have high thickening efficiency at low concentrations. These materials are largely linear chain resins having molecular weights which range from several hundred thousand up to several million. The preparation of ethylene oxide polymers is well known in the art and they are often prepared by polymerizing ethylene oxide in the presence of certain organo-metallic complexes as polymerization catalysts, such as alkoxo salts and metal-alkyl complexes, a particularly useful catalyst for this purpose being alkaline earth carbonates of certain alkyls. A particularly useful commercially available material of this type is Polyox, sold in various grades such as WSR-35, WSR-205, WSR-301, and WSR-705.

The nitrogen-containing materials which can be treated according to the subject invention are water-soluble solid compounds which normally tend to cake on standing, and which are especially suitable as fertilizers. Such nitrogen-containing materials representatively include urea, ammonium nitrate, ammonium sulfate, potassium nitrate, sodium nitrate, calcium nitrate, and the like, including mixtures thereof.

Further objects and advantages of this invention are illustrated by the following examples, but the various ingredients, amounts and conditions described in these examples should not be construed so as to unduly limit this invention.

*Examples*

A number of runs were made wherein urea was melted and individual samples of such melt were each mixed with 5 weight percent of a gelation agent, according to this invention. The representative gelation agents used were guar flour, gelatine, and polymerized ethylene oxide (Polyox WSR-705). The melts obtained were solidified in the form of discs measuring ¼" in thickness and 2" in diameter. These discs were then immersed in water. After standing quiet for 24 hours in water, it was found that in each case from 30 to 40 weight percent of the original urea content remained undissolved and enclosed in a gelatinous, translucent mass. By way of comparison, a disc of urea prepared in the same manner but not containing any gelation agent had completely dissolved after standing in water for 30 minutes. These examples show that the compositions of matter of this invention have retarded rates of solubility in water, indicating that such compositions when applied to the field as fertilizers will be assimilable over long periods of time.

Various modifications and alterations of this invention will become apparent to those skilled in the art from the foregoing discussion and examples, and it should be understood that this invention is not to be unduly limited to that set forth herein for illustrative purposes.

I claim:

1. A method of supplementing the plant nutrient value of soil, comprising contacting said soil with a fertilizer composition comprising a mixture of a water-soluble nitrogen-containing compound selected from the group consisting of urea, ammonium nitrate, ammonium sulfate, potassium nitrate, sodium nitrate, and calcium nitrate and a water-soluble lyophilic colloid selected from the group consisting of guar flour, gelatin, and polymerized ethylene oxide.

2. A method according to claim 1 wherein said amount of lyophilic colloid is in the range of from 0.5 to 20 weight percent of said composition.

3. A method according to claim 1 wherein said amount of lyophilic colloid is in the range of from 2 to 10 weight percent of said composition.

4. The method according to claim 1, wherein said nitrogen-containing compound is urea and said colloid is polymerized ethylene oxide.

5. The method according to claim 1, wherein said nitrogen-containing compound is urea and said colloid is gelatin.

6. The method according to claim 1, wherein said nitrogen-containing compound is urea and said colloid is guar flour.

7. A method of preparing a solid fertilizer composition having a retarded rate of solubility, comprising melting ammonium sulfate, admixing with the resulting melt a small amount, sufficient to retard the solubility of said composition, of a water-soluble lyophilic colloid selected from the group consisting of guar flour, gelatin, and polymerized ethylene oxide, and solidifying the resulting mixture.

8. A method of preparing a solid fertilizer composition having a retarded rate of solubility, comprising melting ammonium nitrate, admixing with the resulting melt a small amount, sufficient to retard the solubility of said composition, of a water-soluble lyophilic colloid selected from the group consisting of guar flour, gelatin, and polymerized ethylene oxide, and solidifying the resulting mixture.

9. A method of preparing a solid fertilizer composition having a retarded rate of solubility, comprising melting a solid water-soluble nitrogen-containing fertilizer selected from the group consisting of urea, ammonium nitrate, ammonium sulfate, potassium nitrate, sodium nitrate, and calcium nitrate, admixing guar flour with the resulting melt in a small amount sufficient to retard the solubility of said composition, and solidifying the resulting mixture.

10. The method according to claim 9, wherein said fertilizer is urea.

11. A method of preparing a solid fertilizer composition having a retarded rate of solubility, comprising melting a solid water-soluble nitrogen-containing fertilizer selected from the group consisting of urea, ammonium nitrate, ammonium sulfate, potassium nitrate, sodium nitrate, and calcium nitrate, admixing gelatin with the resulting melt in a small amount sufficient to retard the solubility of said composition, and solidifying the resulting mixture.

References Cited in the file of this patent

UNITED STATES PATENTS

| | | |
|---|---|---|
| 1,875,914 | Keyssner et al. | May 10, 1932 |
| 2,032,608 | Antrim | Mar. 3, 1936 |
| 2,059,273 | Piggotl | Nov. 3, 1936 |
| 2,091,993 | Jones | Sept. 7, 1937 |
| 2,117,808 | Jones | May 17, 1938 |
| 2,124,332 | DeRewal | July 19, 1938 |
| 2,369,110 | Harford | Feb. 6, 1945 |
| 2,657,977 | Stengel | Nov. 3, 1953 |
| 2,766,107 | White | Oct. 9, 1956 |
| 3,034,858 | Vives | May 15, 1962 |
| 3,038,008 | Richter | June 5, 1962 |

FOREIGN PATENTS

| | | |
|---|---|---|
| 354,307 | Great Britain | July 31, 1931 |